United States Patent Office 3,147,851
Patented Sept. 8, 1964

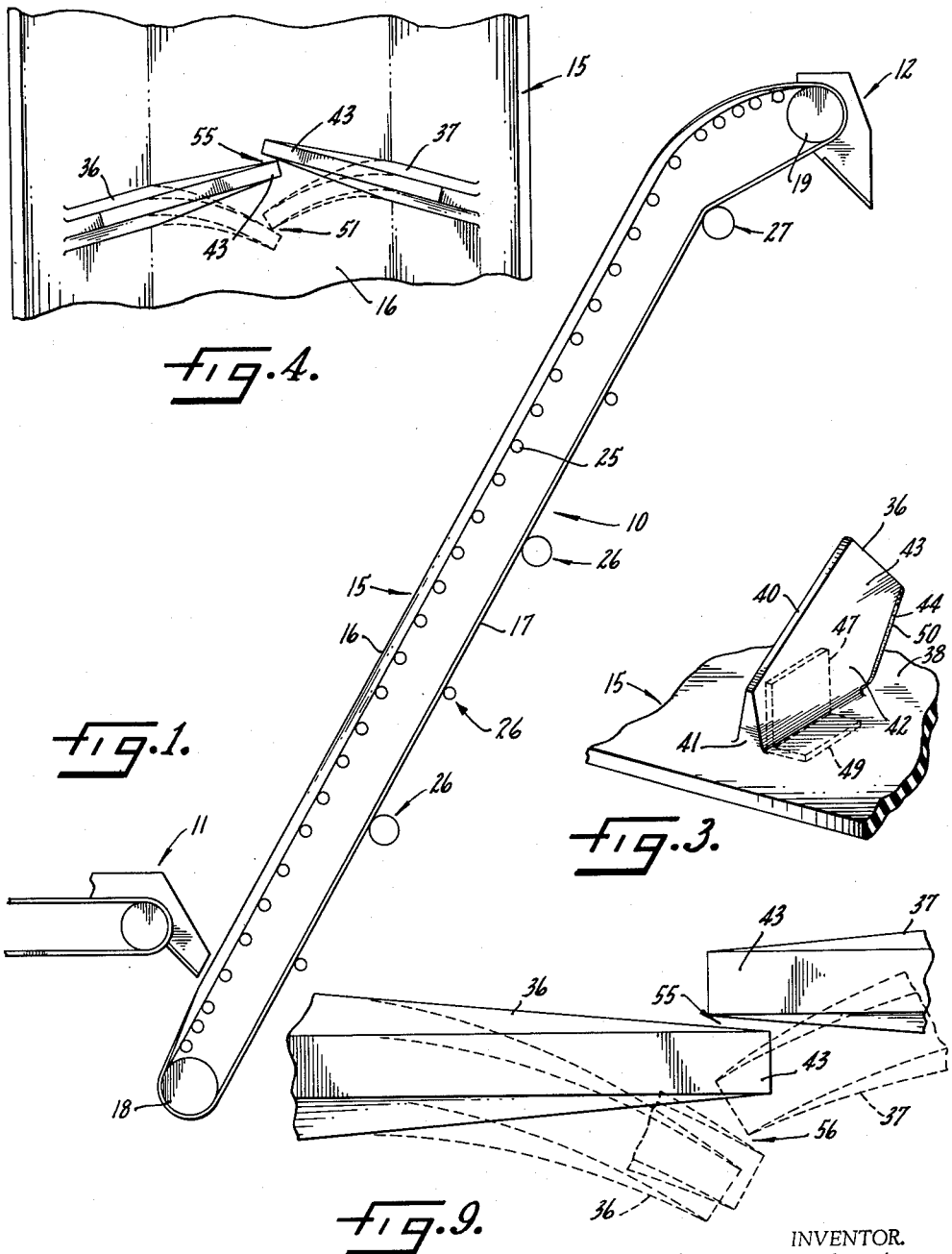

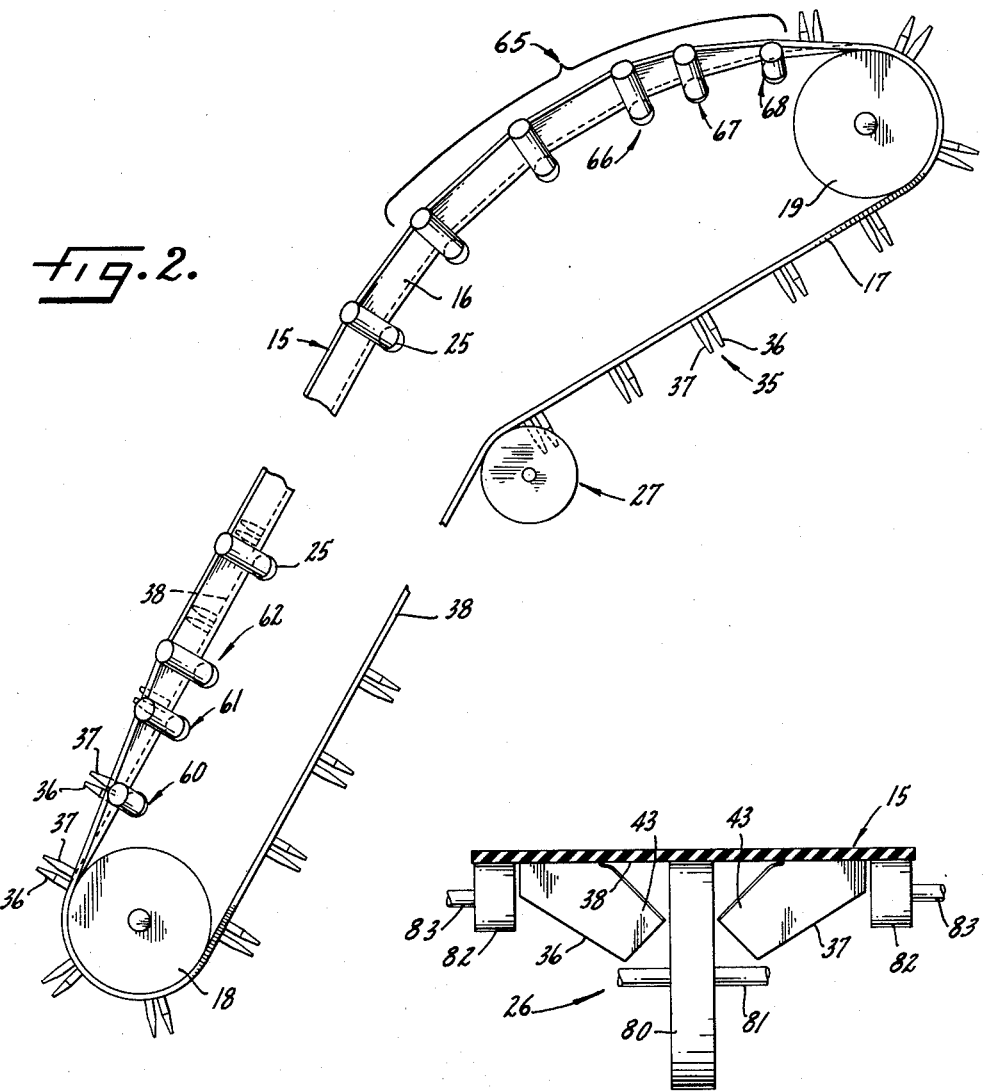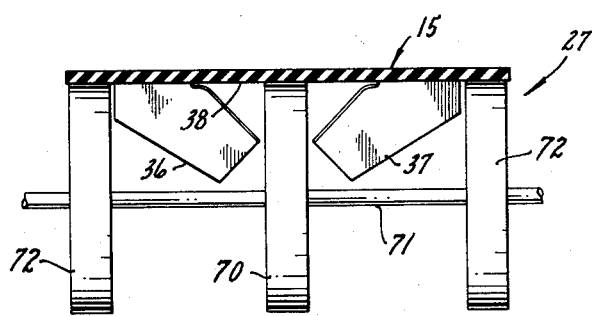

3,147,851
CONVEYOR
Werner Dietrich, 336 Central Ave., Wilmette, Ill.
Filed Dec. 15, 1961, Ser. No. 159,593
8 Claims. (Cl. 198—193)

This invention relates in general to material handling and more particularly to belt conveyors. It deals specifically with a new and improved steep incline conveyor and conveyor belt arrangement.

Belt conveyors are, of course, utilized in numerous and varied industries. For example, a belt conveyor might be utilized to transport ore along a mine runway to loading facilities or over varied surface terrain from open pit mining areas, for example. The belt conveyors normally utilized for these purposes, and in various other applications where bulk material such as loose ore must be transported, are of the troughing type.

The troughing conveyor, as such, is relatively old. It ordinarily incorporates a plurality of idler assemblies forming a roughly V-shaped trough which is adapted to support the carrying strand of a conveyor belt. This arrangement forces the sides of the belt to bend upwardly, of course, and the bulk material supported on the carrying strand is held securely on the belt without spilling over its sides.

Troughing conveyors might incorporate rigid side frames which carry a succession of generally regularly spaced troughing idler assemblies between them, or they might incorporate a flexible side frame construction. On the other hand, under some circumstances, frameless conveyor arrangements might be utilized. In any case, and with virtually every type of support construction utilized in conjunction with the troughing idler concept, the conveyor might be used over stretches of level ground or in mine passages, for example, or it might even be adapted for use up and down inclined surfaces.

It will be readily understood, however, that when a conveyor of this type is utilized on an inclined surface, the degree of incline is sharply limited by the character of the material being transported on the conveyor. In other words, certain materials lend themselves more readily to moving up an inclined surface on a conveyor than do others. Some materials, for example, have a greater tendency to continually slip back down the incline as the conveyor attempts to carry them up. This tendency is dictated primarily by the surface coefficient of friction of the particles of material, among other characteristics. More understandably, it is readily equated in terms of the "angle of repose" of the material in question.

The angle of repose of the material might be determined by building up a pile of the material and continually pouring more material on the apex of the pile. The steeper the sides of the pile which can be established, the greater the angle of repose of the material being piled. In contrast, of course, if the material has a great tendency to slide down the sides of the pile and spread out to form relatively slightly inclined sides thereon, it will be obvious that the material has a relatively low angle of repose. This angle of repose is measurable by conventional means.

The desirability of conveying all types of bulk material up relatively steep inclines will readily be recognized. The steeper the incline which can be negotiated in some instances, for example, the less floor or surface space is required for setting up the conveyor. This might be extremely important in restricted quarters such as in a crowded beneficiation plant or a steel mill, for example.

It is presently common practice to use skip hoists or similar devices for raising bulk material up steep inclines since belt conveyors, in many instances, cannot be inclined sufficiently to be practical. The few belt conveyors which have been developed for inclined operation are either inefficient or as complex and expensive as a skip hoist system, for example. Such is the case with blast furnace charging equipment. The skip hoists utilized are substantially complicated pieces of machinery and are relatively expensive. In addition, they are relatively difficult to maintain. Furthermore their load carrying ability is substantially limited when compared with a continuous conveyor, for example.

It is an object of this invention to provide a new and improved steep incline belt conveyor.

It is another object to provide a steep incline belt conveyor capable of transporting a maximum amount of bulk material without significant back slippage of the material.

It is still another object to provide a conveyor of the aforedescribed character which is capable of the transporting material up inclines in the neighborhood of 60 degrees from the horizontal or more.

It is yet another object to provide a belt arrangement for a steep incline belt conveyor which readily adapts itself to troughing.

It is a further object to provide a belt arrangement incoporating a fin construction which facilitates proper tensioning of the conveyor belt.

It is another object to provide a new and improved steep incline belt conveyor which is more efficient and less expensive than known steep incline material handling means.

The above and other objects are realized in accordance with the present invention by providing a new and improved steep incline conveyor and belt arrangement. Briefly, the invention contemplates a conveyor including a belt arrangement having appropriately constructed fins mounted in opposed relationship at generally regularly spaced intervals longitudinally of a flexible belt. The fins are adapted to cooperate when the belt is troughed to prevent back slippage of the bulk material being carried. As a result, the material can be carried up substantially steep inclines of in the neighborhood of 60 degrees from the horizontal or more. The fins are adapted to subsequently become disassociated on the return strand of the conveyor belt such that return roller assemblies can properly tension the belt and support it along the return strand.

In one aspect of this invention, the cooperating fins are somewhat flexible and are spaced longitudinally of the belt to permit overlapping. They are inclined upstream of the direction of belt travel such that a maximum amount of heavy bulk material can be carried ahead of the fins without them bending back to such an extent that the material is permitted to slip backwardly between the cooperating fins. In another aspect of this invention, wherein normal quantities of average weight material must be handled, the cooperating flexible fins are slightly spaced longitudinally of the belt and extend generally parallel to each other.

The invention, both as to its organization and method of operation, taken with further objects and advantages thereof, will best be understood by reference to the following description taken in connection with the accompanying drawings, in which:

FIGURE 1 is a diagrammatic side elevational view of a steep incline conveyor and belt arrangement embodying the features of this invention, adapted for charging a blast furnace or the like;

FIGURE 2 is an enlarged diagrammatic side elevational view of the steep incline conveyor and belt arrangement embodying the features of this invention, with parts broken away;

FIGURE 3 is a perspective view of a fin construction incorporated in the belt arrangement;

FIGURE 4 is a plan view of one form of the conveyor belt and fin construction embodying the features of this invention;

FIGURE 9 is an enlarged plan view of another form of the fin construction embodying the features of this invention;

FIGURE 10 is a sectional view through the return strand of the conveyor belt showing belt tensioning snub pulley assembly; and FIGURE 11 is a sectional view through the return strand of the conveyor belt showing a return strand roller assembly.

Figure 5:
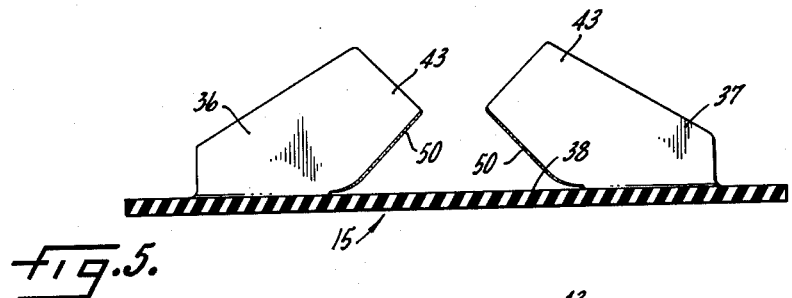
FIGURE 5 is a sectional view through the carrying strand of the conveyor belt showing the belt prior to being troughed by the troughing roller assemblies.

Referring now to the drawings and particularly to FIGURE 1, a steep incline belt conveyor embodying the features of this invention is illustrated generally at 10. In a logical application of this steep incline conveyor, it is adapted to raise blast furnace charging materials in bulk form from a conventional horizontal feed conveyor, seen generally at 11, to the discharge chute 12 atop the blast furnace, for example. The conveyor 10 is adapted to convey bulk material up a substantially steep incline, in this instance in the neighborhood of about 60 degrees from the horizontal, regardless of the angle of repose of the bulk material, without back slippage of the material down the incline.

The steep incline conveyor 10 includes a conveyor belt arrangement 15 having a carrying strand 16 and a return strand 17. The belt arrangement 15 is supported at its lower end by a conventional take-up pulley 18 and supported at its upper end as well as being driven by a conventional drive pulley 19. A plurality of generally regularly spaced, conventional troughing idler assemblies 25 support the carrying strand 16 of the belt 15 while return strand roller assemblies 26 support the return strand 17 of the belt 15. A tensioning snub pulley assembly 27 imparts proper tension to the belt 15.

The take-up pulley 18, the drive pulley 19, the troughing idler assemblies 25, the return strand roller assemblies 26 and the snub pulley assembly 27 are preferably supported by conventional frame structure of one type or another (not shown). Since the frame structure forms no part of this invention, it is not thought necessary that it be illustrated or described herein. However, it might be embodied in a rigid side frame or a flexible side frame, for example. Under certain conditions frameless supports might even be utilized.

Referring now to FIGURE 2, it will be seen that the conveyor belt arrangement 15 carries longitudinally spaced pairs of retaining fins 36 and 37 on its outer surface 38. Each pair of fins 36 and 37 is adapted to overlap and cooperate along the carrying strand 16 of the conveyor belt 15 to retain the bulk material on the carrying strand as it proceeds up the incline from the feed conveyor 11 to the discharge chute 12.

At the beginning of the return strand 17, subsequent to the belt 15 passing over the drive pulley 19, the fins 36 and 37 become separated once more to permit the adjustable tensioning snub pulley assembly 27 to engage the outer surface 38 of the return strand 17 and impart a predetermined amount of belt tension to the belt for optimum conveyor efficiency. This separation of the fins 36 and 37 as the return strand 17 begins also facilitates the support of the remainder of the return strand by the return roller assemblies 26.

Each of the retaining fins 36 and 37 is identical in construction. Consequently, it will be understood that a detailed description of one will suffice for an understanding of the construction of the other. Referring to FIGURE 3, the fin 36 comprises a generally chevron-shaped sheet of resilient material such as rubber or belting material or the like. The fin 36 is somewhat narrow along its upper edge 40 and substantially thicker along its lower edge 44. It includes a base portion 42 which is rigidly embedded in the outer surface 38 of the belt 15 and vulcanized thereto. A wing portion 43 of the fin 36 extends inwardly of the base portion 42 and is not connected to the belt 15, its lower edge 44 diverging upwardly therefrom.

As seen in dotted lines in FIGURE 3, a metal stiffener 47 has a transverse base member 49 which might be embedded in the belt 15 to provide vertical stability for the fin 36. Each fin is embedded in the surface 38 of the belt 15 at a predetermined distance from a corresponding longitudinally extending edge of the belt to provide obstruction free paths along the edges for support by the return strand roller assemblies 26 and the tensioning snub pulley assembly 27.

When the belt 15 troughs, the lower edge 44 of the wing portion 43 of the fin 36 comes into contact with the surface 38 of the belt. To aid in preventing the wing portions 43 from bending readily under the weight of a load of bulk material, the lower edge 44 is preferably provided with a layer of gum rubber material 50. This gum rubber material has a high coefficient of friction, of course, and consequently tends to hold the wing portions 43 in rigid relationship relative to the surface 38 of the belt.

Referring now to FIGURE 4, wherein one form of the belt arrangement embodying this invention is illustrated, it will be seen that the wing portions 43 of the fins 36 and 37 overlap when the belt 15 is in its maximum troughing relationship. This is facilitated by the fact that the fins 36 and 37 are, to a slight extent, longitudinally offset on the conveyor belt 15.

In addition, the fins are canted in the direction of conveyor belt travel so that they overlap at an angle, as seen generally at 55. This relationship effectively allows the belt 15 to carry a maximum amount of heavy material before back slippage of the material occurs. Since the wing portions 43 of the fins 36 and 37 normally bend backwardly under a load of bulk material until they reach the dotted line position (as seen at 51) in FIGURE 4 before a gap develops between the wing portions, it will readily be seen that leakage of bulk material between the fins 36 and 37 is prevented until the latter relationship exists. With the forwardly canted fins as illustrated in FIGURE 4, the wing portions 43 must bend linearly backwardly for a substantial distance before such leakage develops. Such bending is normally not encountered even with bulk materials in the higher specific gravity range.

Figure 6:
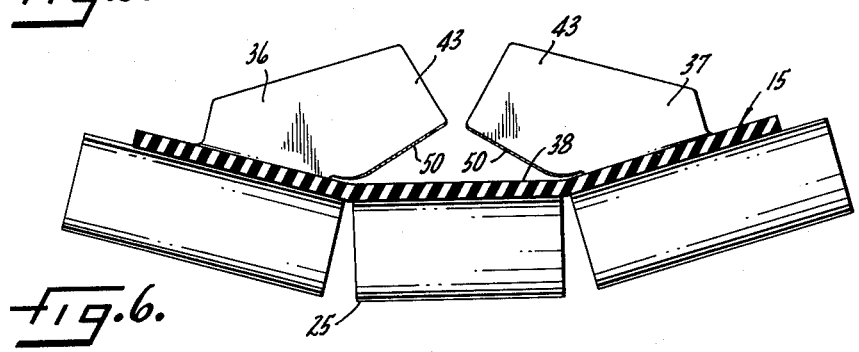
FIGURE 6 is a view similar to FIGURE 5 showing the carrying strand of the conveyor belt after troughing has been initiated by the first stage of troughing idler assemblies.

Referring again to FIGURE 2, the operation of the carrying strand 16 of the conveyor belt 15 and its associated fins 36 and 37 is one of establishing an overlapping relationship between the wing portions 43 of the fins, maintaining it along the carrying strand and separating the fins as the belt 15 enters its return strand 17. As will readily be seen in FIGURE 2, when the belt 15 enters the carrying strand 16 as it departs the take-up pulley 18, it is substantially planar. Consequently, the fins 36 and 37 are separated in the manner shown in FIGURE 5. The first idler assembly 25 which the belt 15 encounters is seen generally at 60 and it is mounted in such a manner that a slight troughing relationship is imparted to the belt, as seen in FIGURE 6. At this stage, the fins 36 and 37 come into more closely adjoining relationship but are not yet overlapped.

Figure 7:
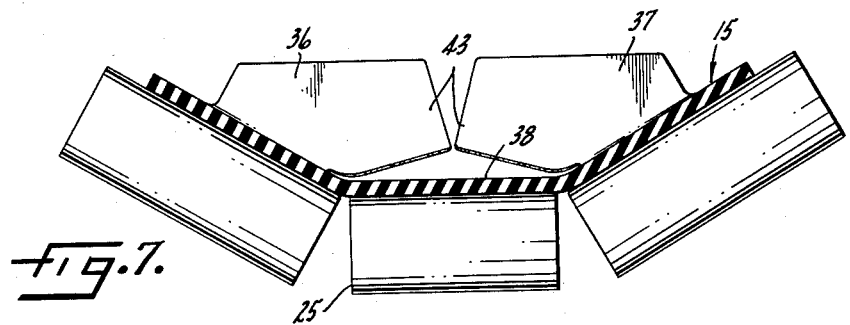
FIGURE 7 is a view similar to FIGURE 5 showing the carrying strand of the conveyor belt after it has been troughed to a substantial degree by a succeeding stage of the troughing idler assemblies.
Figure 8:
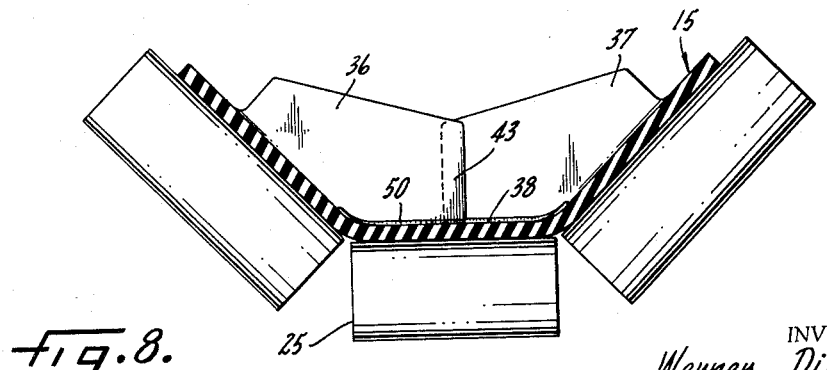
FIGURE 8 is a view similar to FIGURE 5 showing the fully troughed carrying strand of the conveyor belt arrangement embodying the features of this invention.

When the belt 15 reaches the next set of troughing idler assemblies 25, as seen generally at 61, the belt is troughed to an even greater extent by the configuration established in this idler assembly. Consequently, the fins 36 and 37 move into even more closely adjoining relationship, as seen in FIGURE 7. Finally, upon reaching the fully troughed idler assembly seen generally at 62, the belt assumes its fully troughed, load carrying relationship. In this relationship, the fins overlap to the extent seen in FIGURE 8 and the gum rubber strips 50 on the bottom edges 44 of the wing portions 43 and engage the upper surface 38 of the belt 15.

At this point, as seen in FIGURE 1, the bulk material is normally deposited on the inclined conveyor 10 by the feed conveyor 11. The bulk material is carried up the incline by the overlapping fins 36 and 37. In the case where substantially large quantities of relatively heavy bulk material must be handled, the fin configuration shown in FIGURE 4 is preferably utilized. Because of its forwardly canted plan configuration, a substantial amount of rearward bending of the wing portions 43 of the fins 36 and 37 can take place before back slippage of the bulk material is permitted by separation of the fins. Where bulk material of average specific gravity or weight must be carried up a substantially steep incline, the fin arrangement illustrated in FIGURE 9 might be utilized. The arrangement of FIGURE 9 obviously permits a lesser amount of rearward bending of the wing portions 43 of the fins before they separate.

Referring specifically to the forwardly canted fin configuration illustrated in FIGURE 4, the wing portions 43 of the fins 36 and 37 must bend backwardly a substantial distance under the weight of the bulk material before separation of the ends of the wing portions occurs, as seen at 51. This linear distance might be in the neighborhood of about four inches or more. It is sufficient, at any rate, to prevent back slippage of the material under all but the most adverse conditions.

As an aid to the prevention of the rearward bending of the wing portions 43 of the fins 36 and 37, the gum rubber surfaces 50 are provided on the lower edges 44 of the wing portions 43. These gum rubber surfaces engage the surface 38 of the belt 15 when complete troughing has taken place and a high friction interference relationship is established between the wing portions 43 and the belt surface 38. Consequently, the wing portions do not readily bend backwardly under the weight of a load of bulk material even though they might do so if supported solely by the semi-rigid qualities of the fins 36 and 37.

In the case where lighter bulk materials will normally be transported by the conveyor 10, it has been found that the generally parallel fins 36 and 37 shown in FIGURE 9, might be utilized. In such case, the wing portions 43 of the fins 36 and 37 bend backwardly in a linear relationship for a lesser distance before separation between the wing portions occurs, as seen at 56. Again, the gum rubber surfaces 50 provided on the lower edges 44 of the wing portions 43 retard the rearward bending movement of the wing portions under load.

When the belt 15 approaches the end of its carrying strand 16, the conveyor framework (not shown) is so constructed that the concluding series 65 of idler roller assemblies 25 defines an arc which continually decreases the angle of the carrying strand relative to the ground until, at the point where the carrying strand passes over the drive pulley 19, the angle is approximately zero. In other words, the belt is substantially horizontal at this point. When, in this arcuate path, the angle of the carrying strand relative to the horizontal has decreased to in the neighborhood of 20 degrees or thereabout, the carrying strand begins to flatten out or lose its troughed configuration. This is effected by the last stages of the idler roller assemblies 25, seen generally at 66, 67, and 68, which have successively decreasing troughing configurations. It is at an angle of 20 degrees or thereabouts, of course, that the angle of repose of virtually any material being conveyed is overcome. Consequently, when the wings 43 of the fins being to separate as the belt flattens, the angle of the carrying strand relative to the ground has decreased to a value less than the angle of repose of the material and back slippage does not occur.

From the belt 15 at the end of its carrying strand 16, as it passes over the drive pulley 19, the bulk material preferably drops into a discharge chute 12 whereupon the flattened conveyor belt 15 proceeds into its return strand 17. The fins 36 and 37 and the belt 15 once more assume the relationship shown in FIGURE 5. In this relationship, the belt 15 proceeds to the tensioning snub pulley assembly 27 which is conventionally adjustable transversely of the conveyor 10 to impart a predetermined amount of tension to the belt and insure load carrying efficiency, as has been pointed out.

The tensioning snub pulley assembly 27 is shown generally in FIGURE 10. It includes a central roller 70 supported for rotation with a shaft 71. The shaft 71 might be adjustably supported from any conventional supporting framework. The tensioning snub pulley assembly 27 also includes a pair of side rollers 72 mounted for rotation with the shaft 71. It will be seen that the central roller 70 is substantially narrow in width such that it passes freely between the wing portions 43 of the oppositely disposed fins 36 and 37 and engages the outer surface 38 of the belt 15. In a similar manner, the side rollers 72 are narrow enough such that they engage the surface 38 of the belt adjacent the edges of the belt 15 between corresponding fins 36 and 37 and the edges of the belt.

In this manner, tension is readily applied to the belt 15 without the fins 36 and 37 interferring with the tensioning rollers 70 and 72. In practice, the return roller assemblies 26 might be substantially identical in construction and arrangement to the tensioning snub pulley assembly 27. However, alternative arrangements might be used as well.

An alternative arrangement of idler roller assemblies 26 is shown in detail in FIGURE 11. It includes a central roller 80 supported for rotation with a shaft 81. The shaft 81 might be adjustably supported from a conventional supporting framework (not shown). A pair of smaller side rollers 82 bracket the roller 80 and are mounted for rotation on shafts 83. In practice, a pair of side rollers 82 are preferably alternated along the return strand with single center rollers 80, as seen in FIGURE 1. However, such an arrangement is merely exemplary of various combinations of rollers which might be used.

What has been described is a new and improved steep incline conveyor incorporating a unique conveyor belt arrangement. Because of the interlocking fin construction of the belt arrangement, substantially heavy loads of relatively high specific gravity bulk material can be carried up inclines of in the neighborhood of 60 degrees to the horizontal or more. Notwithstanding the development of this overlapping relationship on the carrying strand of the conveyor belt, a disassociation of the fins takes place to such an extent on the return strand that proper tensioning of the conveyor belt can be maintained through a tensioning snub pulley assembly. In addition, the return roller assemblies readily support the return strand of the conveyor belt without interferring or being interferred with insofar as the fin construction is concerned.

Although the conveyor belt arrangement embodying the features of the present invention has been described solely in terms of flexible fins 36 and 37, it should be understood that the fins might be metal plates or another substantially non-flexible material without departing from the theme of the invention. In such case, of course, the tendency for the wings 43 of the fins to bend backward under load would not be significant. This construction might be advantageous where extremely heavy loads are being carried.

A steep incline conveyor such as has been illustrated and described herein might readily replace substantially more expensive and complicated skip hoists used to raise bulk materials up for charging blast furnaces, for example. This conveyor system can function within the same area that a skip hoist can, for example, and do so at a considerable saving in cost. In addition, a substantially greater amount of material can be carried in a shorter period of time by such a conveyor system.

While several embodiments described herein are at present considered to be preferred, it is understood that various modifications and improvements may be made therein, and it is intended to cover in the appended claims all such modifications and improvements as fall within the true spirit and scope of the invention.

What is desired to be claimed and secured by Letters Patent of the United States is:

1. A conveyor belt arrangement for a troughing belt conveyor comprising a continuous flexible belt adaptable to be supported on a carrying strand by troughing idler means and on a return strand by return roller means, fin means mounted on the load carrying surface of said belt, said fin means including a pair of fins disposed transversely of said belt, said fins comprising main portions spaced transversely apart and secured to said belt, and wing portions extending toward the center of said belt and having free edges so designed as to abut the underlying belt surface when the belt is troughed for normal load carrying, said wing portions overlapping transversely of said belt when said belt is troughed on its carrying strand so as to form a relatively gap-free barrier transversely of the carrying strand.

2. The conveyor belt arrangement of claim 1 further characterized in that said fins are longitudinally displaced from each other on said belt.

3. The conveyor belt arrangement of claim 1 further characterized in that said fins are canted longitudinally of said belt in the direction of belt travel.

4. The conveyor belt arrangement of claim 1 further characterized in that said fins are comprised of flexible material.

5. The conveyor belt arrangement of claim 4 further characterized by and including means on said wing portions for cooperating with said belt surface when said wing portions abut the belt to inhibit bending of said flexible fins under load.

6. A flexible belt conveyor for conveying material up a steep incline comprising a conveyor belt, a plurality of troughing idler assemblies for supporting the carrying strand of said conveyor belt, means for supporting the return strand of said conveyor belt, fin means mounted on the load carrying surface of said belt, said fin means including a pair of fins disposed transversely of said belt, said fins comprising main portions spaced transversely apart and secured to said belt and wing portions extending toward the center of said belt and having free edges so designed as to abut the underlying belt surface when the belt is troughed for normal load carrying, said wing portions overlapping transversely of said belt when said belt is troughed on its carrying strand so as to form a relatively gap-free barrier transversely of the carrying strand, a first series of troughing idler assemblies at the beginning of said carrying strand having progressively increasingly troughed configurations to establish a trough in said belt, a second series of troughing idler assemblies at the end of said carrying reach having progressively decreasingly troughed configurations to de-trough said conveyor belt.

7. The conveyor of claim 6 further characterized in that said second series of troughing idler assemblies is inclined at a lesser angle to the horizontal than said first series of troughing assemblies.

8. A conveyor belt arrangement for a troughing belt conveyor comprising a continuous flexible belt adapted to be supported on a carrying strand by troughing idler means and on a return strand by return roller means, fin means mounted on the load carrying surface of said belt, said fin means including a pair of fins disposed transversely of said belt, said fins comprising main portions spaced transversely apart and secured toward the center of said belt and having free edges so designed for normal load carrying as to abut the underlying belt surface when the belt is troughed, said wing portions overlapping transversely of said belt when said belt is troughed on its carrying strand so as to form a relatively gap-free barrier of substantially constant height transversely of the carrying strand.

References Cited in the file of this patent

UNITED STATES PATENTS

| | | |
|---|---|---|
| 2,457,407 | Sebastian | Dec. 28, 1948 |
| 2,556,920 | Hills | June 12, 1951 |
| 2,818,966 | Gill | Jan. 7, 1958 |

FOREIGN PATENTS

| | | |
|---|---|---|
| 810,482 | France | Dec. 28, 1936 |
| 958,549 | Germany | Feb. 21, 1957 |

UNITED STATES PATENT OFFICE
CERTIFICATE OF CORRECTION

Patent No. 3,147,851 September 8, 1964

Werner Dietrich

It is hereby certified that error appears in the above numbered patent requiring correction and that the said Letters Patent should read as corrected below.

Column 6, line 1, for "being" read -- begin --.

Signed and sealed this 29th day of December 1964.

(SEAL)
Attest:

ERNEST W. SWIDER
Attesting Officer

EDWARD J. BRENNER
Commissioner of Patents